United States Patent
Tao

(10) Patent No.: US 12,058,060 B2
(45) Date of Patent: Aug. 6, 2024

(54) MIXED AIRTIME MANAGEMENT

(71) Applicant: ARRIS Enterprises LLC, Suwanee, GA (US)

(72) Inventor: Peng Tao, Shenzhen (CN)

(73) Assignee: ARRIS ENTERPRISES LLC, Horsham, PA (US)

( * ) Notice: Subject to any disclaimer, the term of this patent is extended or adjusted under 35 U.S.C. 154(b) by 386 days.

(21) Appl. No.: 17/433,357

(22) PCT Filed: Sep. 24, 2020

(86) PCT No.: PCT/CN2020/117480
§ 371 (c)(1),
(2) Date: Aug. 24, 2021

(87) PCT Pub. No.: WO2022/061658
PCT Pub. Date: Mar. 31, 2022

(65) Prior Publication Data
US 2022/0311563 A1    Sep. 29, 2022

(51) Int. Cl.
*H04B 7/0452* (2017.01)
*H04L 5/00* (2006.01)
(Continued)

(52) U.S. Cl.
CPC ......... *H04L 5/0023* (2013.01); *H04B 7/0452* (2013.01); *H04W 72/044* (2013.01); *H04W 84/12* (2013.01); *H04W 88/16* (2013.01)

(58) Field of Classification Search
CPC .. H04L 5/0023; H04B 7/0452; H04W 72/044; H04W 84/12; H04W 88/16; H04W 16/14; H04W 74/0808
See application file for complete search history.

(56) References Cited

U.S. PATENT DOCUMENTS

2012/0051351 A1   3/2012  Lee et al.
2017/0325264 A1*  11/2017 Cherian ............. H04W 74/006
(Continued)

FOREIGN PATENT DOCUMENTS

| CN | 106688284 | 5/2017 |
| CN | 111344981 | 6/2020 |
| WO | 2018/072596 | 4/2018 |

OTHER PUBLICATIONS

International Search Report and the Written Opinion of the international Searching Authority dated Jun. 28, 2021 in International (PCT) Application No. PCT/CN2020/117480.
(Continued)

*Primary Examiner* — Faruk Hamza
*Assistant Examiner* — Axia A Guadalupe Cruz
(74) *Attorney, Agent, or Firm* — Wenderoth, Lind & Ponack, L.L.P.

(57) ABSTRACT

A gateway device and method distribute available airtime across client devices in a wireless local area network (WLAN). The method includes establishing a wireless connection with a plurality of client devices in the WLAN, determining whether each client device is a legacy Wi-Fi station (STA) or a Wi-Fi 6 STA, respectively, and distributing the available airtime across the client devices based on whether the plurality of client devices include legacy Wi-Fi STAs only, Wi-Fi 6 STAs only, or combinations thereof, and depending on whether or not the Wi-Fi 6 STAs have multi-user, multiple input/multiple output (MU-MIMO) capability.

21 Claims, 7 Drawing Sheets

(51) Int. Cl.
*H04W 72/044* (2023.01)
*H04W 84/12* (2009.01)
*H04W 88/16* (2009.01)

(56) References Cited

U.S. PATENT DOCUMENTS

| | | | |
|---|---|---|---|
| 2017/0339701 A1 | 11/2017 | Choi et al. | |
| 2018/0184449 A1* | 6/2018 | Wilhelmsson | H04W 74/0816 |
| 2018/0249506 A1 | 8/2018 | Amiri et al. | |
| 2019/0124556 A1 | 4/2019 | Verma et al. | |
| 2020/0136687 A1* | 4/2020 | Liu | H04B 7/0456 |
| 2021/0014873 A1* | 1/2021 | Akhtar | H04W 74/0808 |

OTHER PUBLICATIONS

Broadcom Corporation Discussion on LAA LBT Category 4 Design for DL 3GPP TSG-RAN Meeting #82 R1-154498 Aug. 28, 2015 (Aug. 28, 2015).

Extended European Search Report issued May 23, 2024, in corresponding European Patent Application No. 20954510.2.

* cited by examiner

MIXED AIRTIME MANAGEMENT

BACKGROUND

A wireless networking device, such as a residential gateway or an access point (AP), can implement Legacy Airtime Management techniques to distribute available airtime evenly across multiple legacy Wi-Fi client devices or stations (e.g., Wi-Fi 5 STAs, Wi-Fi 4 STAs). This prevents clients with legacy Wi-Fi hardware or marginal connections from consuming too much bandwidth. With the legacy Wi-Fi clients, IEEE 802.11a/g/n/ac radios currently use Orthogonal Frequency Division Multiplexing (OFDM) for single-user transmissions on an 802.11 frequency. Even though the full bandwidth conceptually consists of many parallel channels, all subcarriers are modulated with data intended for a single receiver. For example, the gateway or AP can divide the available bandwidth in equal proportions allocated among each respective client (e.g., each STA weight of airtime is the same). In this case, each individual OFDM frame is allocated to a single legacy STA, such that the gateway or AP will send a frame to each legacy STA one-by-one. Thus, the gateway or AP can only communicate with one station at a time using Legacy Airtime Management.

With the recent advancement from the legacy Wi-Fi protocols to Wi-Fi 6, an IEEE 802.11ax radio can utilize Orthogonal Frequency-Division Multiple Access (OFDMA), which is a multi-user version of the OFDM digital modulation technology. OFDMA subdivides a channel into smaller frequency allocations, called resource units (RUs). Thus, OFDMA divides each frame into multiple small subcarriers. A technique for OFDMA resource management involves implementing a control function in a wireless local area network (WLAN) for allocation of resources to multiple Wi-Fi 6 clients to enable OFDMA communications. The control function determines a plurality of transmission resources for OFDMA communications of a plurality of Wi-Fi 6 STAs in the WLAN, wherein the determination includes allocating a plurality of subcarriers (RUs) to the STAs. Thus, instead of Legacy Airtime Management, a gateway or AP can implement Wi-Fi 6 Resource Unit (RU) Management techniques to distribute available airtime evenly across multiple Wi-Fi 6 client devices. For example, the gateway or AP can also divide the available bandwidth into equal proportions allocated among each respective client (e.g., each STA weight of airtime is the same). In this case, however, each individual frame is divided among the Wi-Fi 6 STAs. Thus, the gateway or AP can communicate with multiple stations at a time using Wi-Fi 6 RU Management.

Multi-user, multiple input/multiple output (MU-MIMO) is a wireless technology supported by routers and endpoint devices. MU-MIMO was created to support environments where multiple users are trying to access the wireless network at the same time. The nature of the IEEE 802.11 protocol is that users are served on a first-come, first-served basis. An MU-MIMO transmitter uses the spatial diversity to send N independent streams to N independent receivers.

Currently, a gateway or AP performing Legacy Airtime Management will send every frame, which use all bandwidth and all spatial streams. However, since there is no OFDMA and MU-MIMO available for legacy Wi-Fi STAs (e.g., Wi-Fi 5 or Wi-Fi 4), the Legacy Airtime Management technique has low throughput and high latency. Therefore, it would be desirable to provide a solution that enables a gateway device or AP to use MU-MIMO to distribute available airtime (spatial streams) across client devices, in a manner that increases throughput and reduces latency compared to Legacy Airtime Management.

Furthermore, a gateway or AP performing Wi-Fi 6 Resource Unit (RU) Management only works on Wi-Fi 6 to assign subcarriers to different Wi-Fi 6 STAs. That is, Wi-Fi 6 RU Management is not backwards-compatible with legacy clients (Wi-Fi 5 STAs or Wi-Fi 4 STAs). The proposed solution should also provide backwards-compatibility to support both OFDMA for Wi-Fi 6 STAs and OFDM for legacy Wi-Fi STAs, respectively. Therefore, it would be desirable to provide a solution that optimally combines various different bandwidth management techniques for wireless networks that include a combination of legacy Wi-Fi STAs and Wi-Fi 6 STAs.

SUMMARY

According to some aspects of the present disclosure, an improved gateway device and method are provided for implementing Wi-Fi 6 Airtime Management (MU-MIMO) to assign MU-MIMO spatial streams to Wi-Fi 6 STAs with MU-MIMO capability. According to some aspects of the present disclosure, an improved gateway device and method are provided for implementing Mixed Airtime Management, which combines multiple different bandwidth management methods (e.g., Legacy Airtime Management and Wi-Fi 6 Resource Unit (RU) Management, along with the proposed Wi-Fi 6 Airtime Management (MU-MIMO) technique) to assign OFDM frames, OFDMA subcarriers (RUs), and/or MU-MIMO spatial streams to legacy STAs (e.g., Wi-Fi 5 STAs or Wi-Fi 4 STAs) and Wi-Fi 6 STAs, respectively.

An aspect of the present disclosure provides a gateway device for distributing available airtime across client devices in a wireless local area network (WLAN). The gateway device includes a memory storing instructions, and a processor configured to execute the instructions to establish a wireless connection with a plurality of client devices in the WLAN, determine whether each client device is a legacy Wi-Fi station (STA) or a Wi-Fi 6 STA, respectively, and distribute the available airtime across the client devices based on whether the plurality of client devices include legacy Wi-Fi STAs only, Wi-Fi 6 STAs only, or combinations thereof, and depending on whether or not the Wi-Fi 6 STAs have multi-user, multiple input/multiple output (MU-MIMO) capability.

In an aspect of the present disclosure, when the plurality of client devices are all legacy Wi-Fi STAs, the processor is configured to execute the instructions to distribute the available airtime across the client devices by performing legacy airtime management to assign orthogonal frequency-division multiplexing (OFDM) frames to the legacy Wi-Fi STAs.

In an aspect of the present disclosure, when the plurality of client devices are all Wi-Fi 6 STAs without MU-MIMO capability, the processor is configured to execute the instructions to distribute the available airtime across the client devices by performing Wi-Fi 6 resource unit (RU) management to assign orthogonal frequency-division multiple-access (OFDMA) subcarriers to the Wi-Fi 6 STAs without MU-MIMO capability.

In an aspect of the present disclosure, when the plurality of client devices are all Wi-Fi 6 STAs with MU-MIMO capability, the processor is configured to execute the instructions to distribute the available airtime across the client devices by performing Wi-Fi 6 airtime management to assign MU-MIMO spatial streams to the Wi-Fi 6 STAs with MU-MIMO capability.

In an aspect of the present disclosure, a weight of airtime allocated to each Wi-Fi 6 STA with MU-MIMO capability is based on a number of antennas of each Wi-Fi 6 STA, respectively, such that a Wi-Fi 6 STA with multiple antennas is allocated a greater weight of airtime than a Wi-Fi 6 STA with a single antenna.

In an aspect of the present disclosure, when the plurality of client devices include a combination of one or more legacy Wi-Fi STAs, one or more Wi-Fi 6 STAs without MU-MIMO capability, and one or more Wi-Fi 6 STAs with MU-MIMO capability, the processor is configured to execute the instructions to distribute the available airtime across the client devices by performing mixed airtime management, including performing legacy airtime management to assign OFDM frames to the one or more legacy Wi-Fi STAs, which uses all bandwidth and all spatial streams, performing Wi-Fi 6 resource unit (RU) management to assign OFDMA subcarriers to the one or more Wi-Fi 6 STAs without MU-MIMO capability, which uses only a subset of the subcarriers and all spatial streams, and performing Wi-Fi 6 airtime management to assign MU-MIMO spatial streams to the one or more Wi-Fi 6 STAs with MU-MIMO capability, which uses all bandwidth and only a subset of the spatial streams.

In an aspect of the present disclosure, at least some of the one or more legacy Wi-Fi STAs, the one or more Wi-Fi 6 STAs without MU-MIMO capability, and the one or more Wi-Fi 6 STAs with MU-MIMO capability have different weights of airtime allocated thereto, respectively.

An aspect of the present disclosure provides a method for distributing available airtime across client devices in a wireless local area network (WLAN). The method includes establishing a wireless connection with a plurality of client devices in the WLAN, determining whether each client device is a legacy Wi-Fi station (STA) or a Wi-Fi 6 STA, respectively, and distributing the available airtime across the client devices based on whether the plurality of client devices include legacy Wi-Fi STAs only, Wi-Fi 6 STAs only, or combinations thereof, and depending on whether or not the Wi-Fi 6 STAs have multi-user, multiple input/multiple output (MU-MIMO) capability.

In an aspect of the present disclosure, the method further includes the additional operations performed by the gateway device as described above.

An aspect of the present disclosure provides a non-transitory computer-readable medium storing instructions for distributing available airtime across client devices in a wireless local area network (WLAN), the instructions when executed by a processor of a gateway device causing the gateway device to perform operations comprising establishing a wireless connection with a plurality of client devices in the WLAN, determining whether each client device is a legacy Wi-Fi station (STA) or a Wi-Fi 6 STA, respectively, and distributing the available airtime across the client devices based on whether the plurality of client devices include legacy Wi-Fi STAs only, Wi-Fi 6 STAs only, or combinations thereof, and depending on whether or not the Wi-Fi 6 STAs have multi-user, multiple input/multiple output (MU-MIMO) capability.

In an aspect of the present disclosure, the instructions when executed by the processor further cause the gateway device to perform the additional operations as described above.

The Wi-Fi 6 Airtime Management (MU-MIMO) technique described herein can take advantage of both OFDMA and MU-MIMO on Wi-Fi 6 STAs to optimize bandwidth allocation by splitting bandwidth and spatial streams to different STAs, which both improves throughput and reduces latency (e.g., compared to Legacy Airtime Management). In addition, the Mixed Airtime Management technique described herein also enables backwards-compatibility for networks with a mixture of different types of wireless client devices (including both older or cheaper devices with Wi-Fi 5 or Wi-Fi 4 and a single antenna, and more modern or expensive devices with Wi-Fi 6 and possibly multiple antennas).

BRIEF DESCRIPTION OF DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded as merely examples and not for the purpose of limiting the present disclosure as defined by the appended claims and their equivalents. The words and phrases used in the following description and claims are merely used to enable a clear and consistent understanding of the present disclosure. In addition, descriptions of well-known structures, functions, and configurations may be omitted for clarity and conciseness. Those of ordinary skill in the art will recognize that various changes and modifications of the examples described herein can be made without departing from the spirit and scope of the present disclosure.

Figure 1:
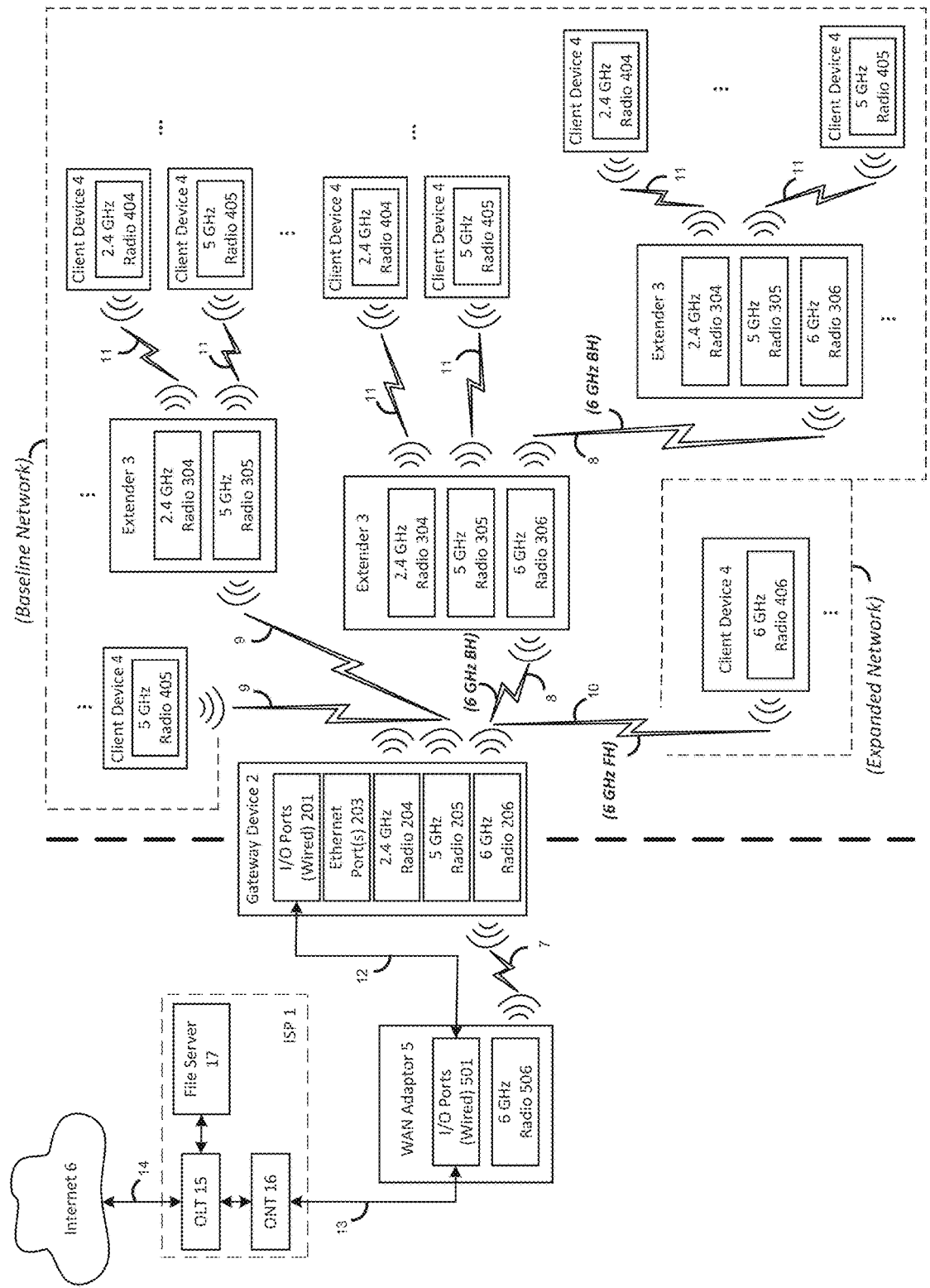
FIG. 1 is a schematic diagram of a system, according to an example embodiment of the present disclosure.

FIG. 1 is a schematic diagram of a system, according to an embodiment of the present disclosure.

It should be appreciated that various example embodiments of inventive concepts disclosed herein are not limited to specific numbers or combinations of devices, and there may be one or multiple of some of the aforementioned electronic apparatuses in the system, which may itself consist of multiple communication networks and various known or future developed wireless connectivity technologies, protocols, devices, and the like.

As shown in FIG. 1, the main elements of the system include a gateway device 2 connected to the Internet 6 via an Internet Service Provider (ISP) 1 and a wide area network (WAN) adaptor 5, and also connected to different wireless devices such as wireless extenders 3 and client devices 4. The system shown in FIG. 1 includes wireless devices (e.g., wireless extenders 3 and client devices 4) that may be connected in one or more wireless networks (e.g., private, guest, iControl, backhaul network, or Internet of things (IoT) network) within the system. Additionally, there could be some overlap between wireless devices (e.g., wireless extenders 3 and client devices 4) in the different networks. That is, one or more network devices could be located in more than one network. For example, the wireless extenders 3 could be located both in a private network for providing content and information to a client device 4 and also included in a backhaul network or an iControl network.

Starting from the top of FIG. 1, the ISP 1 can be, for example, a streaming video provider or any computer for connecting the gateway device 2 to the Internet 6. The ISP 1 may have various hardware components associated therewith, including but not limited to an optical line terminal (OLT) 15, an optical network terminal (ONT) 16, and a file server 17.

The connection 14 between the Internet 6 and the ISP 1 can be implemented using a wide area network (WAN), a virtual private network (VPN), metropolitan area networks (MANs), system area networks (SANs), a DOCSIS network, a fiber optics network (e.g., FTTH (fiber to the home) or FTTX (fiber to the x), or hybrid fiber-coaxial (HFC)), a digital subscriber line (DSL), a public switched data network (PSDN), a global Telex network, or a 2G, 3G, 4G or 5G network, for example.

The wide area network (WAN) adaptor 5 can be a hardware electronic device that provides an interface between the Internet 6 via the ISP 1, and the gateway device 2. The WAN adaptor 5 may include various components, including but not limited to input/output (I/O) ports 501 (wired connection interfaces) such as Ethernet ports, coaxial RF cable ports, fiber optic ports, or the like, and a 6 GHz radio 506 (wireless connection interface). The WAN adaptor 5 "adapts" the 6 GHz interface to an interface supported by the ISP-provided WAN access device (e.g., a connection 13, such as Ethernet, to the ONT 16). Thus, the WAN adaptor 5 can serve as a "6 GHz to Ethernet Bridge" connecting the gateway device 2 to the Internet 6, according to some example embodiments of the present disclosure. Additionally or alternatively, the connection interface between the WAN adaptor 5 and the gateway device 2 may be implemented via a wired connection (e.g., Ethernet, coaxial RF cable, etc.) using one of the I/O ports 501. Other types of WAN access devices include a DOCSIS modem, a DSL modem, and a fixed wireless modem. In some example embodiments, the WAN adaptor 5 may be a separate device that sits in between an ISP-provided modem, modem/router combination or the like, and the gateway device 2.

The connection 13 between the ISP 1 (e.g., via the ONT 16) and the WAN adaptor 5 can be implemented using a wide area network (WAN), a virtual private network (VPN), metropolitan area networks (MANs), system area networks (SANs), a DOCSIS network, a fiber optics network (e.g., FTTH (fiber to the home) or FTTX (fiber to the x), or hybrid fiber-coaxial (HFC)), a digital subscriber line (DSL), a public switched data network (PSDN), a global Telex network, or a 2G, 3G, 4G or 5G network, for example. The connection 13 can further include as some portion thereof a broadband mobile phone network connection, an optical network connection, or other similar connections. For example, the connection 13 can also be implemented using a fixed wireless connection that operates in accordance with, but is not limited to, 3rd Generation Partnership Project (3GPP) Long Term Evolution (LTE) or 5G protocols. It is also contemplated by the present disclosure that connection 13 between the WAN adaptor 5 and the ISP 1 is capable of providing connections between the gateway device 2 and a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G or 5G network, for example.

The gateway device 2 can be, for example, a hardware electronic device that may be a combination modem and network gateway device that combines the functions of a modem, an access point (AP), and/or a router for providing content received from the ISP 1 to network devices (e.g., wireless extenders 3 and client devices 4) in the system. It is also contemplated by the present disclosure that the gateway device 2 can include the function of, but is not limited to, an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content. The gateway device 2 may also be referred to as a residential gateway (RG), a broadband access gateway, a home network gateway, a home router, or a wireless access point (AP).

The gateway device 2 can include one or more wired interfaces, including but not limited to input/output port(s) 201 (e.g., an Ethernet port, a coaxial RF cable port, a fiber optic cable port, or the like) and Ethernet port(s) 203. The gateway device 2 can also include multiple wireless interfaces, including but not limited to a 2.4 GHz radio 204, a 5 GHz radio 205, and a 6 GHz radio 206.

The connection 7 between the gateway device 2 and the WAN adaptor 5 and the connection 8 between the gateway device 2 and the wireless extenders 3 are implemented through a wireless connection that operates in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands. One or more of the connection 7 and/or the connection 8 can also be a wired Ethernet connection.

The connection 7 between the gateway device 2 and the WAN adaptor 5 may be implemented via the 6 GHz radio 206 of the gateway device 2 and the 6 GHz radio 506 of the WAN adaptor 5, for example. The connection 7 enables the gateway device 2 and the WAN adaptor 5 to establish a dedicated 6 GHz wireless backhaul (6 GHz BH) according to some example embodiments of the present disclosure.

Additionally or alternatively, the connection 12 between the gateway device 2 and the WAN adaptor 5 may be implemented using their respective wired interfaces (e.g., Ethernet, cable, fiber optic, or the like), such as via the I/O port(s) 201 of the gateway device 2 and an I/O port 501 of the WAN adaptor 5, for example. The connection 12 enables the gateway device 2 and the WAN adaptor 5 to establish a wired backhaul according to some other example embodiments of the present disclosure.

The connection 8 between the gateway device 2 and the wireless extenders 3 can be implemented using the 6 GHz radio 206 of the gateway device 2 and the 6 GHz radios 306 of the wireless extenders 3, for example. The connection 8 enables the gateway device 2 and the wireless extenders 3 to establish a dedicated 6 GHz wireless backhaul (6 GHz BH) according to example embodiments of the present disclosure. However, the connection 8 could also be implemented using respective wired interfaces (e.g., Ethernet, cable, fiber optic, or the like) in some alternative example embodiments.

The connection 9 between the gateway device 2, the wireless extenders 3, and client devices 4 can be implemented using a wireless connection in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the citizens broadband radio service (CBRS) band, 2.4 GHz bands, 5 GHz bands, 6 GHz bands, or 60 GHz bands. Additionally, the connection 9 can be implemented using a wireless connection that operates in accordance with, but is not limited to, RF4CE protocol, ZigBee protocol, Z-Wave protocol, or IEEE 802.15.4 protocol. It is also contemplated by the present disclosure that the connection 9 can include connections to a media over coax (MoCA) network. One or more of the connections 9 can also be a wired Ethernet connection.

The wireless extenders 3 can be, for example, hardware electronic devices such as access points (APs) used to extend the wireless network by receiving the signals transmitted by the gateway device 2 and rebroadcasting the signals to, for example, client devices 4, which may out of range of the gateway device 2. The wireless extenders 3 can also receive signals from the client devices 4 and rebroadcast the signals to the gateway device 2, or other client devices 4.

The connection 8 between respective wireless extenders 3 is implemented through a wireless connection that operates in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands. The connection 8 can also be a wired Ethernet connection.

The connection 8 between respective wireless extenders 3 can be implemented using the 6 GHz radio 306 of the wireless extenders 3, for example. The connection 8 enables the wireless extenders 3 to establish a dedicated 6 GHz wireless backhaul (6 GHz BH) according to example embodiments of the present disclosure. However, the connection 8 could also be implemented using respective wired interfaces (e.g., Ethernet, cable, fiber optic, or the like) in some alternative example embodiments.

The client devices 4 can be, for example, hand-held computing devices, personal computers, electronic tablets, smart phones, smart speakers, Internet-of-Things (IoT) devices, iControl devices, portable music players with smart capabilities capable of connecting to the Internet, cellular networks, and interconnecting with other devices via Wi-Fi and Bluetooth, or other wireless hand-held consumer electronic devices capable of executing and displaying content received through the gateway device 2. Additionally, the client devices 4 can be a television (TV), an IP/QAM set-top box (STB) or a streaming media decoder (SMD) that is capable of decoding audio/video content, and playing over OTT or MSO provided content received through the gateway device 2.

The connection 10 between the gateway device 2 and the client device 4 is implemented through a wireless connection that operates in accordance with, but is not limited to, any IEEE 802.11 protocols. Additionally, the connection 10 between the gateway device 2 and the client device 4 can also be implemented through a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G or 5G network, for example. The connection 10 can also be implemented using a wireless connection in accordance with Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands. One or more of the connections 10 can also be a wired Ethernet connection.

The connection 10 between the client device 4 and the gateway device 2 can be implemented using the 6 GHz radio 406 of the client device 4 and the 6 GHz radio 206 of the gateway device 2, for example. The connection 10 enables the gateway device 2 and the client device 4 to establish a 6 GHz wireless fronthaul (6 GHz FH) according to example embodiments of the present disclosure. However, the connection 10 could also be implemented using respective wired interfaces (e.g., Ethernet, cable, fiber optic, or the like) in some alternative example embodiments.

The connection 11 between the wireless extenders 3 and the client devices 4 is implemented through a wireless connection that operates in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands. Additionally, the connection 11 can be implemented using a wireless connection that operates in accordance with, but is not limited to, RF4CE protocol, ZigBee protocol, Z-Wave protocol, or IEEE 802.15.4 protocol. Also, one or more of the connections 11 can be a wired Ethernet connection.

The connection 11 between the wireless extenders 3 and the client devices 4 can be implemented using the 2.4 GHz radio 404 or the 5 GHz radio 405 of the client devices 4 and the 2.4 GHz radio 304 or the 5 GHz radio 305 of the wireless extenders 3, for example. The connection 11 enables the wireless extenders 3 and the client devices 4 to establish a 2.4 GHz wireless fronthaul or a 5 GHz wireless fronthaul, according to example embodiments of the present disclosure. However, the connection 11 could also be implemented using respective wired interfaces (e.g., Ethernet, cable, fiber optic, or the like) in some alternative example embodiments.

Figure 2:
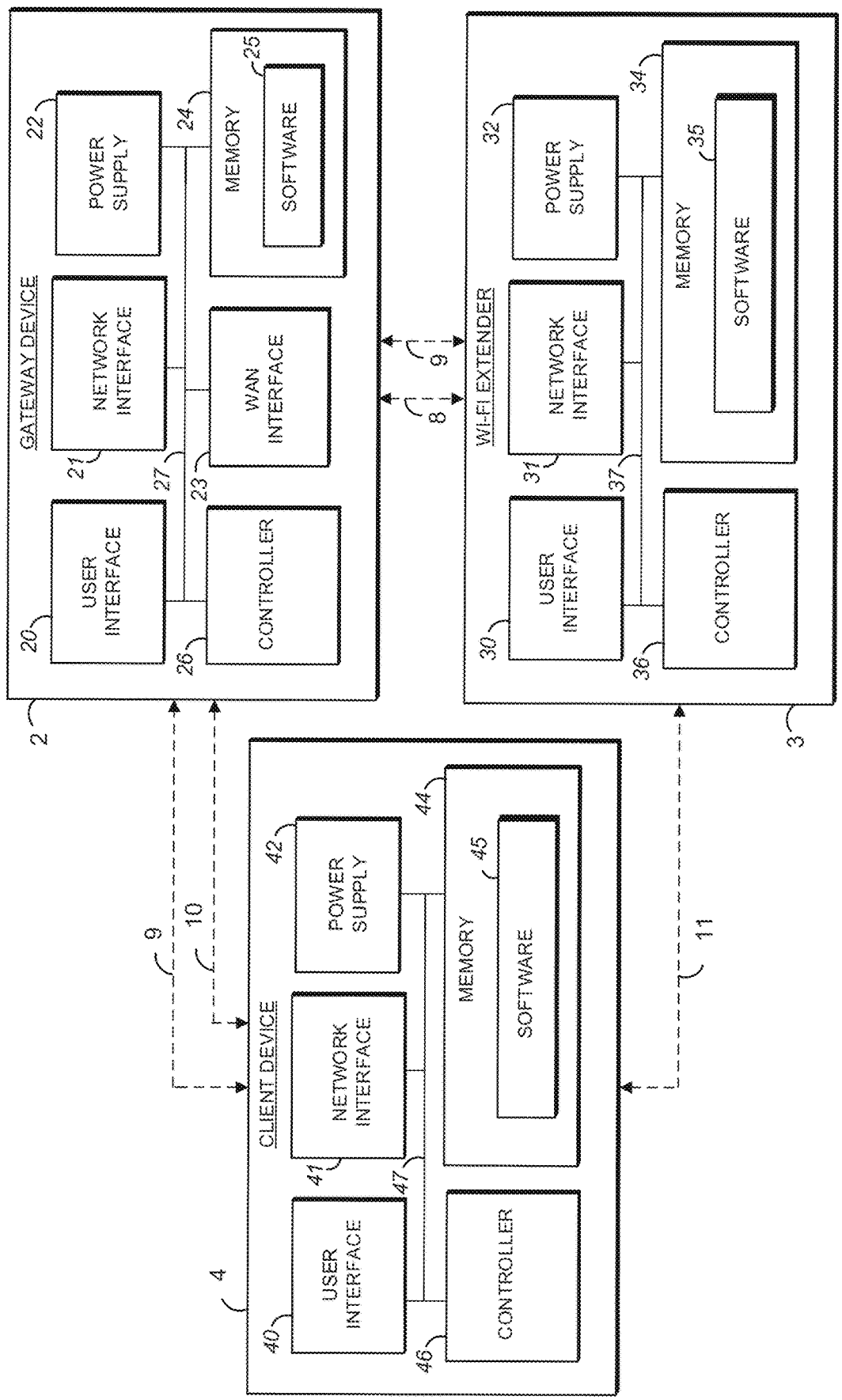
FIG. 2 is a more detailed block diagram illustrating various components of an exemplary gateway device, client device, and wireless extender implemented in the system of FIG. 1 according to an example embodiment of the present disclosure.

A more detailed description of the exemplary internal components of the gateway device 2, the wireless extenders 3, and the client devices 4 shown in FIG. 1 will be provided in the discussion of FIG. 2. However, in general, it is contemplated by the present disclosure that the gateway device 2, the wireless extenders 3, the client devices 4, and the WAN adaptor 5 include electronic components or electronic computing devices operable to receive, transmit, process, store, and/or manage data and information associated with the system, which encompasses any suitable processing device adapted to perform computing tasks consistent with the execution of computer-readable instructions stored in a memory or a computer-readable recording medium (e.g., a non-transitory computer-readable medium).

Further, any, all, or some of the computing components in the gateway device 2, the wireless extenders 3, the client devices 4, and the WAN adaptor 5 may be adapted to execute any operating system, including Linux, UNIX, Windows, MacOS, DOS, and ChromOS as well as virtual machines adapted to virtualize execution of a particular operating system, including customized and proprietary operating systems. The gateway device 2, the wireless extenders 3, the client devices 4, and the WAN adaptor 5 are further equipped with components to facilitate communication with other computing devices over the one or more network connections to local and wide area networks, wireless and wired networks, public and private networks, and any other communication network enabling communication in the system.

FIG. 2 is a more detailed block diagram illustrating various components of an exemplary gateway device, client device, and wireless extender implemented in the system of FIG. 1, according to an embodiment of the present disclosure.

Although FIG. 2 only shows one wireless extender 3 and one client device 4, the wireless extender 3 and the client device 4 shown in the figure are meant to be representative of the other wireless extenders 3 and client devices 4 shown in FIG. 1. Similarly, the connections 8, 9, 10, and 11 between the gateway device 2, the wireless extender 3, and the client device 4 shown in FIG. 2 are meant to be exemplary connections and are not meant to indicate all possible connections between the gateway devices 2, wireless extenders 3, and client devices 4. Additionally, it is contemplated by the present disclosure that the number of gateway devices 2, wireless extenders 3, and client devices 4 is not limited to the number of gateway devices 2, wireless extenders 3, and client devices 4 shown in FIGS. 1 and 2.

Now referring to FIG. 2 (e.g., from left to right), the client device 4 can be, for example, a computer, a portable device, an electronic tablet, an e-reader, a PDA, a smart phone, a smart speaker, an IoT device, an iControl device, portable music player with smart capabilities capable of connecting to the Internet, cellular networks, and interconnecting with other devices via Wi-Fi and Bluetooth, or other wireless hand-held consumer electronic device capable of executing and displaying the content received through the gateway device 2. Additionally, the client device 4 can be a TV, an IP/QAM STB, or an SMD that is capable of decoding audio/video content, and playing over OTT or MSO provided content received through the gateway device 2.

As shown in FIG. 2, the client device 4 includes a user interface 40, a network interface 41, a power supply 42, a memory 44, and a controller 46.

The user interface 40 includes, but is not limited to, push buttons, a keyboard, a keypad, a liquid crystal display (LCD), a thin film transistor (TFT), a light-emitting diode (LED), a high definition (HD) or other similar display device including a display device having touch screen capabilities so as to allow interaction between a user and the client device 4.

The network interface 41 can include, but is not limited to, various network cards, interfaces, and circuitry implemented in software and/or hardware to enable communications with the gateway device 2 and the wireless extender 3 using the communication protocols in accordance with connections 9, 10, and/or 11 (e.g., as described with reference to FIG. 1).

For example, the network interface 41 can include multiple radios (e.g., a 2.4 GHz radio, one or more 5 GHz radios, and/or a 6 GHz radio), which may also be referred to as wireless local area network (WLAN) interfaces. The radios (e.g., 2.4 GHz, 5 GHz, and/or 6 GHz radio(s)) provide a fronthaul (FH) connection between the client device(s) 4 and the gateway device 2 and/or the wireless extender 3.

The power supply 42 supplies power to the internal components of the client device 4 through the internal bus 47. The power supply 42 can be a self-contained power source such as a battery pack with an interface to be powered through an electrical charger connected to an outlet (e.g., either directly or by way of another device). The power supply 42 can also include a rechargeable battery that can be detached allowing for replacement such as a nickel-cadmium (NiCd), nickel metal hydride (NiMH), a lithium-ion (Li-ion), or a lithium Polymer (Li-pol) battery.

The memory 44 includes a single memory or one or more memories or memory locations that include, but are not limited to, a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), a hard disk or any other various layers of memory hierarchy. The memory 44 can be used to store any type of instructions, software, or algorithms including software 45 for controlling the general function and operations of the client device 4 in accordance with the embodiments described in the present disclosure.

The controller 46 controls the general operations of the client device 4 and includes, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software including the software 45 for controlling the operation and functions of the client device 4 in accordance with the embodiments described in the present disclosure. Communication between the components (e.g., 40, 41, 42, 44, 46) of the client device 4 may be established using an internal bus 47.

The wireless extender 3 can be, for example, a hardware electronic device such as an access point (AP) used to extend a wireless network by receiving the signals transmitted by the gateway device 2 and rebroadcasting the signals to client devices 4, which may be out of range of the gateway device 2. The wireless extender 3 can also receive signals from the client devices 4 and rebroadcast the signals to the gateway device 2, mobile device 5, or other client devices 4.

As shown in FIG. 2, the wireless extender 3 includes a user interface 30, a network interface 31, a power supply 32, a memory 34, and a controller 36.

The user interface 30 can include, but is not limited to, push buttons, a keyboard, a keypad, an LCD, a TFT, an LED, an HD or other similar display device including a display device having touch screen capabilities so as to allow interaction between a user and the wireless extender 3.

The network interface 31 can include various network cards, interfaces, and circuitry implemented in software and/or hardware to enable communications with the client device 4 and the gateway device 2 using the communication protocols in accordance with connections 8, 9, and/or 11 (e.g., as described with reference to FIG. 1). For example, the network interface 31 can include multiple radios or sets of radios (e.g., a 2.4 GHz radio, one or more 5 GHz radios, and/or a 6 GHz radio), which may also be referred to as wireless local area network (WLAN) interfaces. One radio or set of radios (e.g., 5 GHz and/or 6 GHz radio(s)) provides a backhaul (BH) connection between the wireless extender 3 and the gateway device 2, and optionally other wireless extender(s) 3. Another radio or set of radios (e.g., 2.4 GHz, 5 GHz, and/or 6 GHz radio(s)) provides a fronthaul (FH) connection between the wireless extender 3 and one or more client device(s) 4.

The power supply 32 supplies power to the internal components of the wireless extender 3 through the internal bus 37. The power supply 32 can be connected to an electrical outlet (e.g., either directly or by way of another device) via a cable or wire.

The memory 34 can include a single memory or one or more memories or memory locations that include, but are not limited to, a RAM, a DRAM, a memory buffer, a hard drive, a database, an EPROM, an EEPROM, a ROM, a flash memory, logic blocks of an FPGA, hard disk or any other various layers of memory hierarchy. The memory 34 can be used to store any type of instructions, software, or algorithm including software 35 associated with controlling the general functions and operations of the wireless extender 3 in accordance with the embodiments described in the present disclosure.

The controller 36 controls the general operations of the wireless extender 3 and can include, but is not limited to, a CPU, a hardware microprocessor, a hardware processor, a multi-core processor, a single core processor, an FPGA, a microcontroller, an ASIC, a DSP, or other similar processing device capable of executing any type of instructions, algorithms, or software including the software 35 for controlling the operation and functions of the wireless extender 3 in accordance with the embodiments described in the present disclosure. General communication between the components (e.g., 30, 31, 32, 34, 36) of the wireless extender 3 may be established using the internal bus 37.

The gateway device 2 can be, for example, a hardware electronic device that can combine the functions of a modem, an access point (AP), and/or a router for providing content received from the content provider (ISP) 1 to network devices (e.g., wireless extenders 3, client devices 4) in the system. It is also contemplated by the present disclosure that the gateway device 2 can include the function of, but is not limited to, an IP/QAM STB or SMD that is capable of decoding audio/video content, and playing OTT or MSO provided content.

As shown in FIG. 2, the gateway device 2 includes a user interface 20, a network interface 21, a power supply 22, a wide area network (WAN) interface 23, a memory 24, and a controller 26.

The user interface 20 can include, but is not limited to, push buttons, a keyboard, a keypad, an LCD, a TFT, an LED, an HD or other similar display device including a display device having touch screen capabilities so as to allow interaction between a user and the gateway device 2.

The network interface 21 may include various network cards, and circuitry implemented in software and/or hardware to enable communications with the wireless extender 3 and the client device 4 using the communication protocols in accordance with connections 8, 9, 10, and/or 11 (e.g., as described with reference to FIG. 1). For example, the network interface 21 can include an Ethernet port (also referred to as a LAN interface) and multiple radios or sets of radios (e.g., a 2.4 GHz radio, one or more 5 GHz radios, and/or a 6 GHz radio, also referred to as WLAN interfaces). One radio or set of radios (e.g., 5 GHz and/or 6 GHz radio(s)) can provide a wireless backhaul (BH) connection between the gateway device 2 and the wireless extender(s) 3. Another radio or set of radios (e.g., 2.4 GHz, 5 GHz, and/or 6 GHz radio(s)) can provide a fronthaul (FH) connection between the gateway device 2 and one or more client device(s) 4.

The power supply 22 supplies power to the internal components of the gateway device 2 through the internal bus 27. The power supply 22 can be connected to an electrical outlet (e.g., either directly or by way of another device) via a cable or wire.

The WAN interface 23 may include various network cards, and circuitry implemented in software and/or hardware to enable communications between the gateway device 2 and the Internet 6, via the ISP 1 and the WAN adaptor 5, using the wired and/or wireless protocols in accordance with connection 7 (e.g., as described with reference to FIG. 1). For example, the WAN interface 23 can include an Ethernet port and one or more radios (e.g., a 6 GHz radio). The WAN interface 23 (e.g., 6 GHz radio) may be used to provide a wireless backhaul (BH) connection between the gateway device 2 and the WAN adaptor 5 (e.g., as described with reference to FIG. 1, and further described with reference to FIG. 3 below), according to example embodiments of the present disclosure. However, the WAN interface 23 could provide a wired Ethernet connection (e.g., a BH connection) between the gateway device 2 and the WAN adaptor 5 according to some alternative example embodiments.

The memory 24 includes a single memory or one or more memories or memory locations that include, but are not limited to, a RAM, a DRAM, a memory buffer, a hard drive, a database, an EPROM, an EEPROM, a ROM, a flash memory, logic blocks of a FPGA, hard disk or any other various layers of memory hierarchy. The memory 24 can be used to store any type of instructions, software, or algorithm including software 25 for controlling the general functions and operations of the gateway device 2 and performing management functions related to the other devices (e.g., wireless extenders 3 and client devices 4) in the network in accordance with the embodiments described in the present disclosure.

The controller 26 controls the general operations of the gateway device 2 as well as performs management functions related to the other devices (e.g., wireless extenders 3 and client device 4) in the network. The controller 26 may also be referred to as a gateway access point (AP) wireless resource controller. The controller 26 can include, but is not limited to, a central processing unit (CPU), a hardware microprocessor, a hardware processor, a multi-core processor, a single core processor, a FPGA, a microcontroller, an ASIC, a DSP, or other similar processing device capable of executing any type of instructions, algorithms, or software including the software 25 for controlling the operation and functions of the gateway device 2 in accordance with the embodiments described in the present disclosure. Communication between the components (e.g., 20, 21, 22, 23, 24, 26) of the gateway device 2 may be established using the internal bus 27. The controller 26 may also be referred to as a processor, generally.

Figure 3:
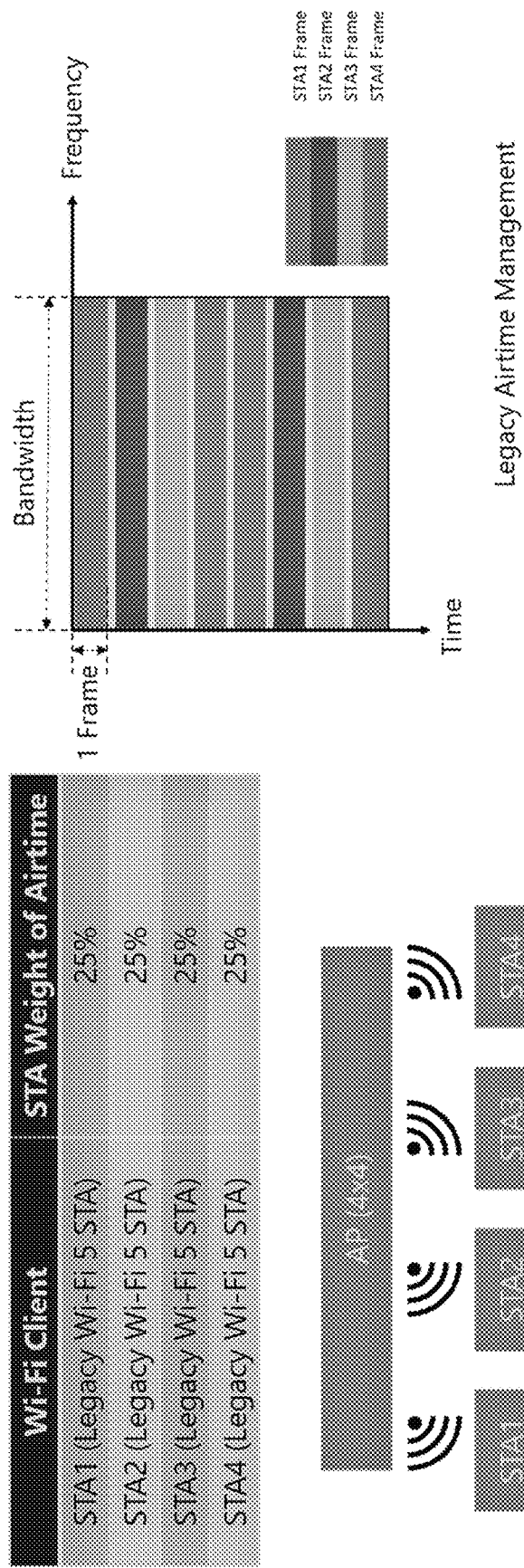
FIG. 3 is a diagram illustrating legacy airtime management according to an example embodiment of the present disclosure.

FIG. 3 is a diagram illustrating legacy airtime management, according to an example embodiment of the present disclosure.

A wireless networking device, such as the gateway device 2 (or similar access point), can implement Legacy Airtime Management to distribute available airtime evenly across multiple legacy Wi-Fi client devices or stations (also referring to as Wi-Fi 5 STAs or Wi-Fi 4 STAs). This prevents clients with legacy Wi-Fi hardware or marginal connections from consuming too much bandwidth. With legacy Wi-Fi clients, 802.11a/g/n/ac radios currently use Orthogonal Frequency Division Multiplexing (OFDM) for single-user transmissions on an 802.11 frequency. Even though the full bandwidth conceptually consists of many parallel channels, all subcarriers are modulated with data intended for a single receiver.

Referring to FIG. 3, assume that there are four legacy Wi-Fi clients (e.g., Wi-Fi 5 STAs) in communication with an access point (e.g, AP (4×4) in FIG. 3), such as the gateway device 2, for example. Using legacy airtime management techniques, the gateway device 2 can evenly divide the available airtime among the four legacy Wi-Fi clients (e.g., each STA weight of airtime is 25% in this non-limiting example). In this case, each individual frame is allocated to a single legacy STA, such that the AP will send a frame to each legacy STA one-by-one. Thus, the AP can only communicate with one station at a time using Legacy Airtime Management.

Figure 4:
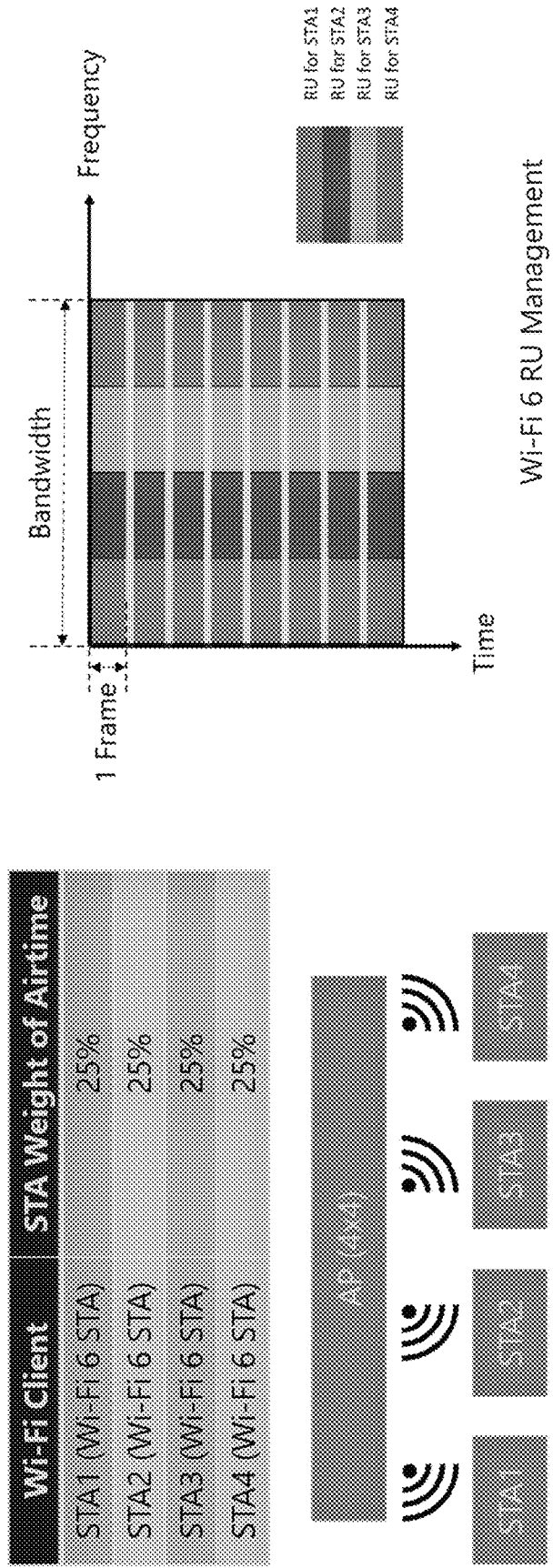
FIG. 4 is a diagram illustrating Wi-Fi 6 resource unit (RU) management according to an example embodiment of the present disclosure.

FIG. 4 is a diagram illustrating Wi-Fi 6 resource unit (RU) management, according to an example embodiment of the present disclosure.

With the recent advancement from the legacy Wi-Fi protocols to Wi-Fi 6, an IEEE 802.11ax radio can utilize Orthogonal Frequency-Division Multiple Access (OFDMA), which is a multi-user version of the OFDM digital modulation technology. OFDMA subdivides a channel into smaller frequency allocations, called resource units (RUs). Thus, OFDMA divides each frame into multiple small subcarriers (or RUs).

A technique for OFDMA resource management involves implementing a control function in a wireless local area network (WLAN) for allocation of resources to multiple Wi-Fi clients (STAs) to enable OFDMA communications. The control function determines a plurality of transmission resources for OFDMA communications of a plurality of STAs in the WLAN, wherein the determination includes allocating a plurality of subcarriers (RUs) to the STAs. Thus, instead of Legacy Airtime Management, the gateway device 2 or AP can implement Wi-Fi 6 Resource Unit (RU) Management to distribute available airtime evenly across multiple Wi-Fi 6 client devices.

Referring to FIG. 4, assume that there are four Wi-Fi 6 clients (e.g., Wi-Fi 6 STAs) in communication with an access point (e.g., AP (4×4) in FIG. 4), such as the gateway device 2, for example. Using Wi-Fi 6 RU management techniques, the AP can evenly divide the available airtime among the four Wi-Fi 6 clients (e.g., each STA weight of airtime is 25% in this non-limiting example). In this case, however, each individual frame is divided among the four Wi-Fi 6 STAs. Thus, the gateway or AP can communicate with multiple stations at a time using Wi-Fi 6 RU Management.

However, the Wi-Fi 6 RU management technique only works on Wi-Fi 6 to assign subcarriers (RUs) to different Wi-Fi 6 STAs, and is not backwards-compatible with legacy Wi-Fi 5 STAs or Wi-Fi 4 STAs. Therefore, it would be desirable to provide a solution that optimally combines various different bandwidth management techniques for wireless networks that include a combination of legacy Wi-Fi STAs and Wi-Fi 6 STAs.

Figure 5:
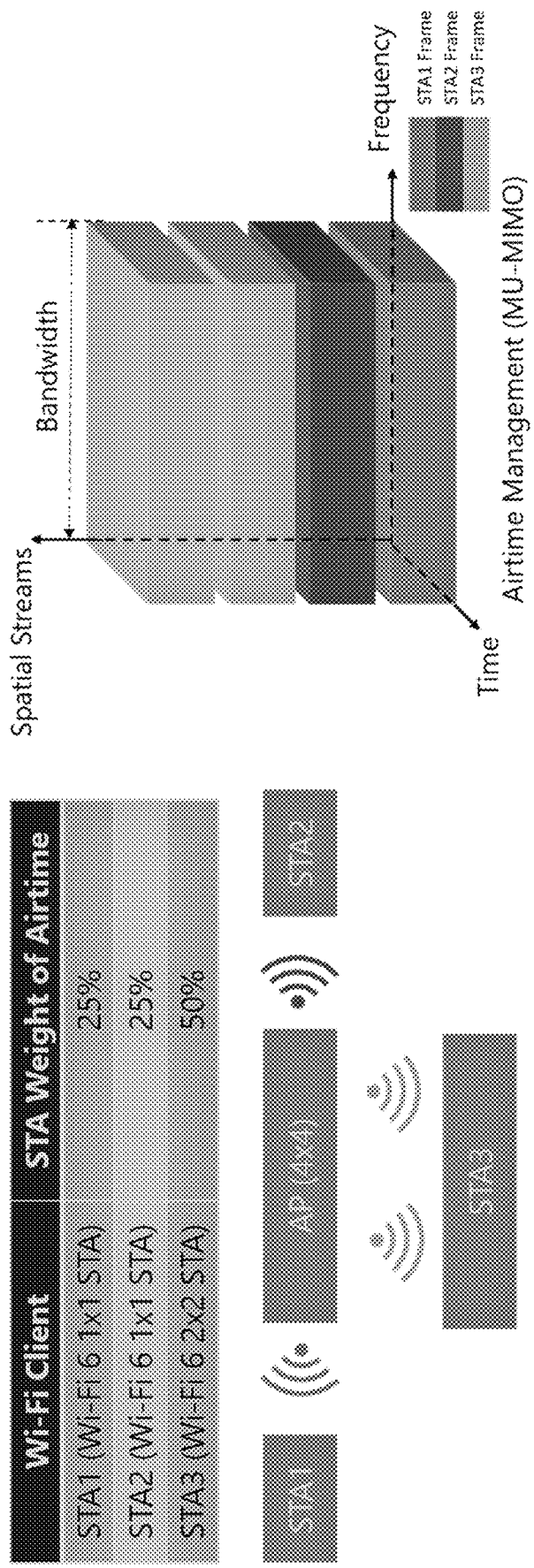
FIG. 5 is a diagram illustrating Wi-Fi 6 airtime management (MU-MIMO) according to an example embodiment of the present disclosure.
Figure 6:
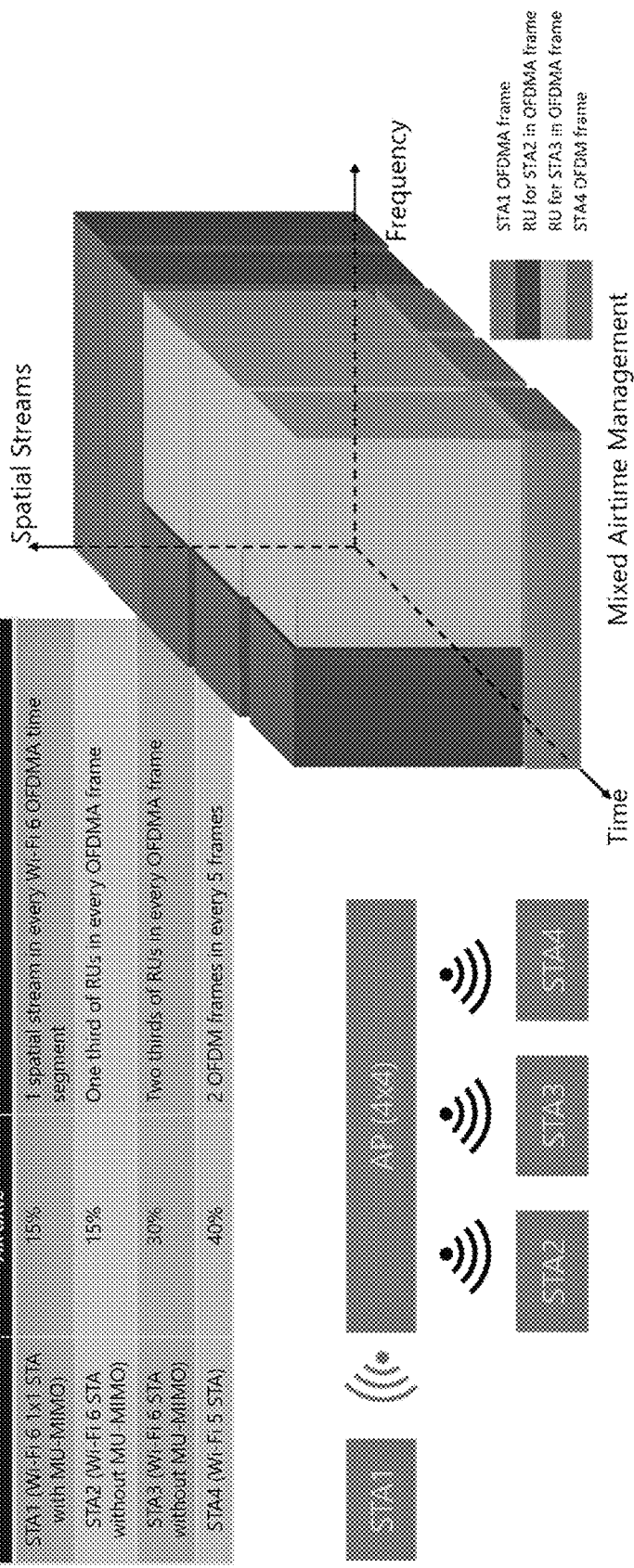
FIG. 6 is a diagram illustrating mixed airtime management according to an example embodiment of the present disclosure.
Figure 7:
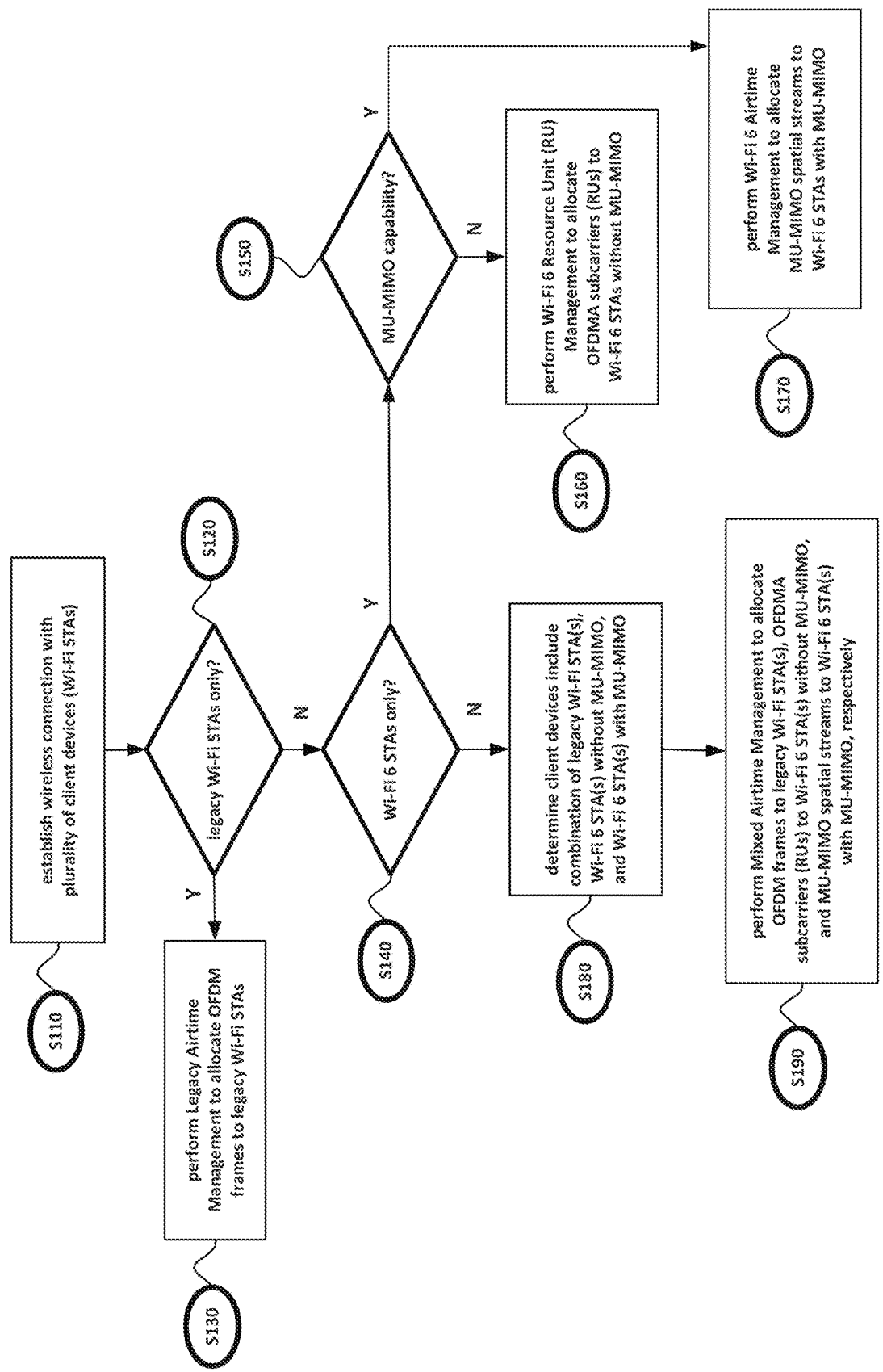
FIG. 7 is a flow chart illustrating a method for distributing available airtime across client devices in a wireless local area network (WLAN) according to an example embodiment of the present disclosure.

Accordingly, aspects of the present disclosure described below with reference to FIGS. 5-7 provide a gateway device 2 (or similar AP) and corresponding method that assigns MU-MIMO spatial streams to MU-MIMO Wi-Fi 6 STAs, and combines multiple different bandwidth management methods to assign OFDM frames, OFDMA subcarriers (RUs), and/or MU-MIMO spatial streams to Wi-Fi 6 STAs and legacy STAs (e.g., Wi-Fi 5 STAs or Wi-Fi 4 STAs), as appropriate, depending on which version among the IEEE 802.11 Wi-Fi protocols is used by each client, respectively, and whether or not each Wi-Fi 6 client has MU-MIMO capability. The proposed solution provides backwards-compatibility to support both OFDMA for Wi-Fi 6 STAs and OFDM for legacy Wi-Fi STAs, respectively.

FIG. 5 is a diagram illustrating Wi-Fi 6 airtime management (MU-MIMO), according to an example embodiment of the present disclosure.

Multi-user, multiple input/multiple output (MU-MIMO) is a wireless technology supported by routers and endpoint devices. MU-MIMO was created to support environments where multiple users are trying to access the wireless network at the same time. The nature of the 802.11 protocol is that users are served on a first-come, first-served basis. An MU-MIMO transmitter uses the spatial diversity to send N independent streams to N independent receivers.

Currently, a gateway or AP performing Legacy Airtime Management will send every frame, which use all bandwidth and all spatial streams. However, since there is no OFDMA and MU-MIMO available for legacy Wi-Fi STAs (e.g., Wi-Fi 5 or Wi-Fi 4), the Legacy Airtime Management technique has low throughput and high latency. Therefore, it would be desirable to provide a solution that enables the gateway device 2 or AP to use MU-MIMO to distribute available airtime (spatial streams) across client devices, in a manner that increases throughput and reduces latency compared to Legacy Airtime Management.

As described above, the gateway device 2 or AP can use Wi-Fi 6 Resource Unit (RU) Management for Wi-Fi 6 STAs without MU-MIMO capability. However, some client devices 4 may be equipped with MU-MIMO capability. Therefore, the gateway device 2 or AP can also implement Wi-Fi 6 Airtime Management (MU-MIMO), which uses MU-MIMO to distribute available airtime (spatial streams) across Wi-Fi 6 STAs with MU-MIMO capability.

Referring to FIG. 5, assume that there are three Wi-Fi clients (two Wi-Fi 6 1×1 STAs, and one Wi-Fi 6 2×2 STA), for example. Using the proposed Wi-Fi 6 airtime management (MU-MIMO) technique, the gateway device 2 or AP can divide the available airtime among the three Wi-Fi clients such that each Wi-Fi 6 1×1 STA weight of airtime is 25% each, but the Wi-Fi 6 2×2 STA weight of airtime is 50%, in this non-limiting example. Thus, the gateway device 2 or AP can assign one station per spatial stream, and may also allocate two or more consecutive or adjacent spatial streams to a single station (thereby distributing more bandwidth to clients with multiple antennas and less bandwidth to clients with a single antenna, for example).

FIG. 6 is diagram illustrating mixed airtime management, according to an example embodiment of the present disclosure.

For wireless networks with a mixture of both legacy Wi-Fi STAs (e.g., Wi-Fi 5 STAs and/or Wi-Fi 4 STAs) and Wi-Fi 6 STAs, the gateway device 2 or AP can further implement Mixed Airtime Management, which combines the proposed Wi-Fi 6 Airtime Management (MU-MIMO) technique (e.g., for Wi-Fi 6 STAs with MU-MIMO) with the Wi-Fi resource unit (RU) Management technique (e.g., for Wi-Fi 6 STAs without MU-MIMO) and the Legacy Airtime Management technique (e.g., for Wi-Fi 5 STAs and Wi-Fi 4 STAs).

Currently, BSSID Airtime Management distributes airtime across client devices associated with the same BSSID (e.g., private SSID, hotspot SSID, guest SSID, etc.). The proposed solutions for Mixed Airtime Management described herein do not affect BSSID Airtime Management, which still works just as usual for both Wi-Fi 6 STAs and legacy Wi-Fi STAs. Mixed Airtime Management distributes airtime across clients under the same BSSID (applies to private SSID, hotspot SSID, guest SSID, etc.). Mixed Airtime Management works on both Wi-Fi 6 STAs and legacy Wi-Fi STAs (e.g., Wi-Fi 5 STAs, Wi-Fi 4 STAs), as Wi-Fi 6 access points (APs) will be backwards-compatible to support both OFDMA and OFDM.

Mixed Airtime Management can take advantage of OFDMA and MU-MIMO on Wi-Fi 6 STAs. In IEEE 802.11ax (Wi-Fi 6), DL OFDMA technology can be used to simultaneously perform MU-MIMO transmission and allocate different RUs for multi-user multiple-access transmission, which increases the concurrent access capacity of the system and balances the throughput. IEEE 802.11ax (Wi-Fi 6) also supports UL MU-MIMO, and UL OFDMA technology is leveraged to allow MU-MIMO transmission and multi-user multiple-access transmission at the same time. This improves the transmission efficiency in multi-user concurrent scenarios and greatly reduces the application delay.

According to STA weight configuration, the gateway device 2 or AP can perform the proposed Mixed Airtime Management technique by: (1) sending OFDM frames to legacy Wi-Fi STAs (e.g., Wi-Fi 5 STAs, Wi-Fi 4 STAs), which uses all bandwidth and all spatial streams; (2) sending OFDMA subcarriers (RUs) to Wi-Fi 6 STAs without MU-MIMO, which uses only some subcarriers (RUs) and all spatial streams; and (3) sending MU-MIMO spatial streams to Wi-Fi 6 STAs with MU-MIMO, which uses all bandwidth and only some spatial streams.

Referring to the table below, the following four scenarios are considered when determining the appropriate bandwidth management method to utilize, depending on Wi-Fi client device type(s) and MU-MIMO capability:

| Scenario | Wi-Fi Client Device Type(s) | Bandwidth Management Method |
| --- | --- | --- |
| 1 | All Legacy Wi-Fi STAs (Wi-Fi 5 STAs or Wi-Fi 4 STAs only) | Legacy Airtime Management |
| 2 | All Wi-Fi 6 STAs without MU-MIMO (No Legacy Wi-Fi STAs) | Wi-Fi 6 Resource Unit (RU) Management |
| 3 | All Wi-Fi 6 STAs with MU-MIMO (No Legacy Wi-Fi STAs) | Wi-Fi 6 Airtime Management (MU-MIMO) |
| 4 | Some Legacy Wi-Fi STAs Some Wi-Fi 6 STAs without MU-MIMO Some Wi-Fi 6 STAs with MU-MIMO | Mixed Airtime Management |

Thus, if all clients are legacy Wi-Fi STAs (e.g., only Wi-Fi 5 STAs or Wi-Fi 4 STAs, no Wi-Fi 6 STAs), the gateway device 2 or AP can use the Legacy Airtime Management technique to assign OFDM frames. However, if all clients are Wi-Fi 6 STAs, the bandwidth management method utilized by the gateway device or AP will depend on whether or not each respective Wi-Fi 6 STA is equipped with MU-MIMO capability. If all clients are Wi-Fi 6 STAs without MU-MIMO capability, the gateway device 2 or AP can use the Wi-Fi 6 Resource Unit (RU) Management technique to assign OFDMA subcarriers (RUs). If all clients are Wi-Fi 6 STAs with MU-MIMO capability, the gateway device 2 or AP can use the Wi-Fi 6 Airtime Management (MU-MIMO) technique to assign MU-MIMO spatial streams. Furthermore, if the clients are a mix of all three of the above-described Wi-Fi client device types, the gateway device 2 or AP can use the Mixed Airtime Management technique to allocate airtime to the clients using multiple different bandwidth management methods, which depends on the client device type and MU-MIMO capability (or lack thereof) of each Wi-Fi STA, respectively.

Referring to FIG. 6, assume that there are four Wi-Fi clients (one Wi-Fi 6 1×1 STA with MU-MIMO, and two Wi-Fi 6 STAs without MU-MIMO, and one legacy Wi-Fi 5 STA), for example. According to the STA weight configuration shown in FIG. 6, Mixed Airtime Management sends five frames as a cycle. Using the proposed Mixed Airtime Management technique, the gateway device 2 or AP can divide the available airtime among the four Wi-Fi clients such that the STA weight of airtime for the Wi-Fi 6 1×1 STA with MU-MIMO is 15% (one spatial stream in every Wi-Fi 6 OFDMA time segment), the STA weight of airtime for one of the Wi-Fi 6 STAs without MU-MIMO is 15% (one third of RUs in every OFDMA frame) and the STA weight of airtime for the other one of the Wi-Fi 6 STAs without MU-MIMO is 30% (two thirds of RUs in every OFDMA frame), and the STA weight of airtime of the legacy Wi-Fi 5 STA is 40% (two OFDM frames in every five frames), in this non-limiting example. Thus, the gateway device 2 or AP can implement Mixed Airtime Management to flexibly assign OFDM frames to legacy Wi-Fi STAs, OFDMA subcarriers (RUs) to Wi-Fi 6 STAs without MU-MIMO capability, and MU-MIMO spatial streams to Wi-Fi 6 STAs with MU-MIMO capability.

In some example embodiments, the STA weight of airtime can be configured manually (e.g., by a user manipulating a user interface of an application to allocate higher or lower weights to respective Wi-Fi client devices 4), and/or may be configured automatically by the gateway device 2 (e.g., based on historical usage, current usage, signal strength (RSSI), and various other factors associated with the Wi-Fi client devices 4). For example, the gateway device 2 or AP can allocate a greater percentage of the available airtime to newer and/or more capable Wi-Fi 6 STAs and a lesser percentage of the available airtime to older and/or less capable legacy Wi-Fi STAs (or vice versa, if desired for some particular use case). Accordingly, the STA weight of airtime for at least some of the client devices 4 can be different, and can be configured manually or automatically, which may depend on various factors including but not limited to Wi-Fi client device type, current demand of each Wi-Fi client, application type (e.g., high bit rate streaming video vs. lower priority data transmissions), and the like. With this potential for customization, limited bandwidth can be assigned to different types of Wi-Fi client devices in a highly efficient manner using a combination of bandwidth management methods.

FIG. 7 is a flow chart illustrating a method for distributing available airtime across client devices in a wireless local area network (WLAN), according to an example embodiment of the present disclosure.

The method may be performed by a gateway device 2 (or other similar access point) and may be implemented via a combination of hardware and software, as described above with reference to FIGS. 1-2. For example, the processor of the gateway device 2 may execute stored instructions to perform algorithm(s) for implementing the above-described Wi-Fi 6 Airtime Management (MU-MIMO) and Mixed Airtime Management techniques.

Referring to FIG. 7, the method begins at step S110 by the gateway device 2 establishing a wireless connection with a plurality of client devices 4, also referred to as Wi-Fi stations (STAs) herein. In some instances, the client devices 4 may include legacy Wi-Fi STAs (e.g., Wi-Fi 5 STAs and/or Wi-Fi 4 STAs) only. In some other instances, the client devices 4 may include Wi-Fi 6 STAs only. In yet some other instances, the client devices 4 may include a combination of one or more legacy Wi-Fi STAs and one or more Wi-Fi 6 STAs.

At step S120, the gateway device 2 determines whether or not the client devices 4 include legacy Wi-Fi STAs (e.g., Wi-Fi 5 or Wi-Fi 4). If the gateway device 2 determines that the wireless network includes legacy Wi-Fi STAs only (Yes at step S120), and there are no Wi-Fi 6 STAs present in the wireless network, the gateway device 2 performs Legacy Airtime Management to allocate OFDM frames to the legacy Wi-Fi STAs at step S130, as described above.

On the other hand, if the wireless network does not include legacy Wi-Fi STAs only (No at step S120), then the gateway device 2 determines whether or not the client devices 4 include Wi-Fi 6 STAs at step S140. If the gateway device determines that the wireless network includes Wi-Fi 6 STAs only (Yes at step S140), and there are no legacy Wi-Fi STAs present in the wireless network, then the method proceeds to step S150.

At step S150, the gateway device 2 determines whether or not the Wi-Fi 6 STAs have multi-user, multiple input multiple output (MU-MIMO) capability. The gateway device may make this determination in various different ways, including but not limited to querying the Wi-Fi STAs to request a response indicating whether they have MU-MIMO capability, referring to a pre-stored device configuration information table relating to the Wi-Fi STAs, obtaining the MU-MIMO capability information upon the Wi-Fi STAs associating to the wireless network, or the like. If the gateway device 2 determines that the wireless network includes Wi-Fi 6 STAs without MU-MIMO capability (No at step S150), then the gateway device 2 performs Wi-Fi 6 Resource Unit (RU) Management to allocate OFDMA subcarriers (RUs) to the Wi-Fi 6 STAs without MU-MIMO at step S160. If the gateway device 2 determines that the wireless network includes Wi-Fi 6 STAs with MU-MIMO capability (Yes at step S150), then the gateway device 2 performs Wi-Fi 6 Airtime Management to allocate MU-MIMO spatial streams to the Wi-Fi 6 STAs with MU-MIMO at step S170.

On the other hand, if the wireless network does not include Wi-Fi 6 STAs only (No at step S140), then the gateway device determines that the client devices 4 include a combination of one or more legacy Wi-Fi STA(s) and one or more Wi-Fi 6 STAs at step S180. In some instances, the legacy Wi-Fi STA(s) may include one or more Wi-Fi 5 STAs and/or one or more Wi-Fi 4 STAs, and the Wi-Fi 6 STAs may include one or more Wi-Fi 6 STAs without MU-MIMO capability, or one or more Wi-Fi 6 STAs with MU-MIMO capability, or a combination thereof. However, it will be appreciated that in some other example embodiments, the Wi-Fi 6 STAs may or may not have MU-MIMO capability (in which case only one of the Wi-Fi 6 RU Management or Wi-Fi 6 Airtime Management techniques would be used, as appropriate).

Finally, at step S190, the gateway device 2 performs Mixed Airtime Management to allocate OFDM frames to the legacy Wi-Fi STA(s), allocate OFDMA subcarriers (RUs) to the Wi-Fi 6 STA(s) without MU-MIMO capability, and allocate MU-MIMO spatial streams to the Wi-Fi 6 STA(s) with MU-MIMO capability, respectively.

Currently, a gateway device (or AP) performing the Legacy Airtime Management technique will send every frame, which use all bandwidth and all spatial streams. However, since there is no OFDMA and MU-MIMO available for legacy Wi-Fi STAs (e.g., Wi-Fi 5 or Wi-Fi 4), the Legacy Airtime Management technique has low throughput and high latency. By contrast, an improved gateway device 2 (or AP) performing the proposed Wi-Fi 6 Airtime Management (MU-MIMO) technique according to aspects of the present disclosure takes advantage of both OFDMA and MU-MIMO to split bandwidth and spatial streams to different STAs, which would both improve throughput and reduce latency.

In addition, a gateway device (or AP) performing the Wi-Fi 6 Resource Unit (RU) Management technique only works on Wi-Fi 6 to assign subcarriers to different Wi-Fi 6 STAs, and is not backwards-compatible with legacy Wi-Fi STAs (e.g., Wi-Fi 5 or Wi-Fi 4). By contrast, an improved gateway device 2 (or AP) performing the proposed Mixed Airtime Management technique according to aspects of the present disclosure assigns spatial streams to Wi-Fi 6 STAs with MU-MIMO capability, and can combine all three of the above-described bandwidth management methods to assign OFDM frames, OFDMA subcarriers (RUs), and/or MU-MIMO spatial streams to Wi-Fi 6 STAs and legacy Wi-Fi STAs (e.g., Wi-Fi 5, Wi-Fi 4), respectively, as appropriate depending on Wi-Fi client device type and MU-MIMO capability. Therefore, the Mixed Airtime Management technique described herein enables backwards-compatibility for wireless networks with a mixture of different types of Wi-Fi client devices (including both older or cheaper devices with Wi-Fi 5 or Wi-Fi 4 and/or a single antenna, and more modern or expensive devices with Wi-Fi 6 and possibly multiple antennas).

The gateway device 2 may be programmed with instructions (e.g., controller instructions) to execute the method for distributing available airtime across client devices in a WLAN in some example embodiments, or may use its native software in some other example embodiments. In FIGS. 3-7, it is assumed that the devices include their respective controllers or processors and their respective software stored in their respective memories, as discussed above in connection with FIG. 2, which when executed by their respective controllers or processors perform the functions and operations for distributing available airtime across client devices in a WLAN in accordance with the example embodiments of the present disclosure.

Each of the elements of the present invention may be configured by implementing dedicated hardware or a software program on a memory controlling a processor to perform the functions of any of the components or combinations thereof. Any of the components may be implemented as a CPU or other processor reading and executing a software program from a recording medium such as a hard disk or a semiconductor memory, for example. The processes disclosed above constitute examples of algorithms that can be affected by software, applications (apps, or mobile apps), or computer programs. The software, applications, computer programs or algorithms can be stored on a non-transitory computer-readable medium for instructing a computer, such as a processor in an electronic apparatus, to execute the methods or algorithms described herein and shown in the drawing figures. The software and computer programs, which can also be referred to as programs, applications, components, or code, include machine instructions for a programmable processor, and can be implemented in a high-level procedural language, an object-oriented programming language, a functional programming language, a logical programming language, or an assembly language or machine language.

The term "non-transitory computer-readable medium" refers to any computer program product, apparatus or device, such as a magnetic disk, optical disk, solid-state storage device (SSD), memory, and programmable logic devices (PLDs), used to provide machine instructions or data to a programmable data processor, including a computer-readable medium that receives machine instructions as a computer-readable signal. By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Use of the phrases "capable of," "configured to," or "operable to" in one or more embodiments refers to some apparatus, logic, hardware, and/or element designed in such a way to enable use thereof in a specified manner.

While the principles of the inventive concepts have been described above in connection with specific devices, apparatuses, systems, algorithms, programs and/or methods, it is to be clearly understood that this description is made only by way of example and not as limitation. The above description illustrates various example embodiments along with examples of how aspects of particular embodiments may be implemented and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. It is contemplated that the implementation of the components and functions of the present disclosure can be done with any newly arising technology that may replace any of the above-implemented technologies. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What we claim is:

1. A gateway device for distributing available airtime across client devices in a wireless local area network (WLAN), the gateway device comprising:
   a memory storing instructions; and
   a processor configured to execute the instructions to:
      establish a wireless connection with a plurality of client devices in the WLAN;
      determine whether each client device is a legacy Wi-Fi station (STA) or a Wi-Fi 6 STA, respectively; and
      distribute the available airtime across the client devices based on whether the plurality of client devices include legacy Wi-Fi STAs only, Wi-Fi 6 STAs only, or combinations thereof, and depending on whether or not the Wi-Fi 6 STAs have multi-user, multiple input/multiple output (MU-MIMO) capability, wherein:
      when the plurality of client devices are all Wi-Fi 6 STAs with MU-MIMO capability, the processor is configured to execute the instructions to:
         distribute the available airtime across the client devices by performing Wi-Fi 6 airtime management to assign MU-MIMO spatial streams to the Wi-Fi 6 STAs with MU-MIMO capability, and
         wherein a weight of airtime allocated to each Wi-Fi 6 STA with MU-MIMO capability is based on a number of antennas of each Wi-Fi 6 STA, respectively, such that a Wi-Fi 6 STA with multiple antennas is allocated a greater weight of airtime than a Wi-Fi 6 STA with a single antenna; and
      when the plurality of client devices include a combination of one or more legacy Wi-Fi STAs, one or more Wi-Fi 6 STAs without MU-MIMO capability, and one or more Wi-Fi 6 STAs with MU-MIMO capability, the processor is configured to execute the instructions to:
         distribute the available airtime across the client devices by performing mixed airtime management, including:
            performing legacy airtime management to assign OFDM frames to the one or more legacy Wi-Fi STAs, which uses all bandwidth and all spatial streams,
            performing Wi-Fi 6 resource (RU) management to assign OFDMA subcarriers to the one or more Wi-Fi 6 STAs without MU-MIMO capability, which uses only a subset of the subcarriers and all spatial streams, and
            performing Wi-Fi 6 airtime management to assign MU-MIMO spatial streams to the one or more Wi-Fi 6 STAs with MU-MIMO capability, which uses all bandwidth and only a subset of the spatial streams.

2. The gateway device of claim 1, wherein, when the plurality of client devices are all legacy Wi-Fi STAs, the processor is configured to execute the instructions to distribute the available airtime across the client devices by performing legacy airtime management to assign orthogonal frequency-division multiplexing (OFDM) frames to the legacy Wi-Fi STAs.

3. The gateway device of claim 1, wherein, when the plurality of client devices are all Wi-Fi 6 STAs without MU-MIMO capability, the processor is configured to execute the instructions to distribute the available airtime across the client devices by performing Wi-Fi 6 resource unit (RU) management to assign orthogonal frequency-division multiple-access (OFDMA) subcarriers to the Wi-Fi 6 STAs without MU-MIMO capability.

4. The gateway device of claim 1, wherein at least some of the one or more legacy Wi-Fi STAs, the one or more Wi-Fi 6 STAs without MU-MIMO capability, and the one or more Wi-Fi 6 STAs with MU-MIMO capability have different weights of airtime allocated thereto, respectively.

5. The gateway device of claim 1, wherein the weight is configured manually using a user interface of an application of the gateway device.

6. The gateway device of claim 1, wherein the weight is configured automatically by the gateway device based on any of historial usage, current usage, signal strength, or any combination thereof.

7. The gateway device of claim 1, the processor is configured to execute the instructions to:
  determine whether or not the Wi-Fi 6 STAs have MU-MIMO capability, wherein the determining comprises:
    querying the plurality of client devices to request a response indicating whether the client devices have MU-MIMO capability;
    referring to a pre-stored device configuration information table relating to the plurality of client devices; or
    obtaining MU-MIMO capability information upon each of the plurality of devices associating to the WLAN.

8. A method for distributing available airtime across client devices in a wireless local area network (WLAN), the method comprising:
  establishing a wireless connection with a plurality of client devices in the WLAN;
  determining whether each client device is a legacy Wi-Fi station (STA) or a Wi-Fi 6 STA, respectively; and
  distributing the available airtime across the client devices based on whether the plurality of client devices include legacy Wi-Fi STAs only, Wi-Fi 6 STAs only, or combinations thereof, and depending on whether or not the Wi-Fi 6 STAs have multi-user, multiple input/multiple output (MU-MIMO) capability, wherein:
    when the plurality of client devices are all Wi-Fi 6 STAs with MU-MIMO capability, the method includes:
      distributing the available airtime across the client devices by performing Wi-Fi 6 airtime management to assign MU-MIMO spatial streams to the Wi-Fi 6 STAs with MU-MIMO capability, and wherein a weight of airtime allocated to each Wi-Fi 6 STA with MU-MIMO capability is based on a number of antennas of each Wi-Fi 6 STA, respectively, such that a Wi-Fi 6 STA with multiple antennas is allocated a greater weight of airtime than a Wi-Fi 6 STA with a single antenna; and
    when the plurality of client devices include a combination of one or more legacy Wi-Fi STAs, one or more Wi-Fi 6 STAs without MU-MIMO capability, and one or more Wi-Fi 6 STAs with MU-MIMO capability, the method includes:
      distributing the available airtime across the client devices by performing mixed airtime management, including:
        performing legacy airtime management to assign OFDM frames to the one or more legacy Wi-Fi STAs, which uses all bandwidth and all spatial streams,
        performing Wi-Fi 6 resource (RU) management to assign OFDMA subcarriers to the one or more Wi-Fi 6 STAs without MU-MIMO capability, which uses only a subset of the subcarriers and all spatial streams, and
        performing Wi-Fi 6 airtime management to assign MU-MIMO spatial streams to the one or more Wi-Fi 6 STAs with MU-MIMO capability, which uses all bandwidth and only a subset of the spatial streams.

9. The method of claim 8, wherein, when the plurality of client devices are all legacy Wi-Fi STAs, the method includes distributing the available airtime across the client devices by performing legacy airtime management to assign orthogonal frequency-division multiplexing (OFDM) frames to the legacy Wi-Fi STAs.

10. The method of claim 8, wherein, when the plurality of client devices are all Wi-Fi 6 STAs without MU-MIMO capability, the method includes distributing the available airtime across the client devices by performing Wi-Fi 6 resource unit (RU) management to assign orthogonal frequency-division multiple-access (OFDMA) subcarriers to the Wi-Fi 6 STAs without MU-MIMO capability.

11. The method of claim 8, wherein at least some of the one or more legacy Wi-Fi STAs, the one or more Wi-Fi 6 STAs without MU-MIMO capability, and the one or more Wi-Fi 6 STAs with MU-MIMO capability have different weights of airtime allocated thereto, respectively.

12. The method of claim 8, wherein the weight is configured manually using a user interface of an application of the gateway device.

13. The method of claim 8, wherein the weight is configured automatically by the gateway device based on any of historical usage, current usage, signal strength, or any combination thereof.

14. The method of claim 8, the method further comprising:
  determining whether or not the Wi-Fi 6 STAs have MU-MIMO capability, wherein the determining comprises:
    querying the plurality of client devices to request a response indicating whether the client devices have MU-MIMO capability;
    referring to a pre-stored device configuration information table relating to the plurality of client devices; or
    obtaining MU-MIMO capability information upon each of the plurality of devices associating to the WLAN.

15. A non-transitory computer-readable medium storing instructions for distributing available airtime across client devices in a wireless local area network (WLAN), the instructions when executed by a processor of a gateway device causing the gateway device to perform operations comprising:
  establishing a wireless connection with a plurality of client devices in the WLAN;
  determining whether each client device is a legacy Wi-Fi station (STA) or a Wi-Fi 6 STA, respectively; and
  distributing the available airtime across the client devices based on whether the plurality of client devices include legacy Wi-Fi STAs only, Wi-Fi 6 STAs only, or combinations thereof, and depending on whether or not the Wi-Fi 6 STAs have multi-user, multiple input/multiple output (MU-MIMO) capability, wherein:

when the plurality of client devices are all Wi-Fi 6 STAs with MU-MIMO capability, the instructions when executed by the processor causing the gateway device to:
distribute the available airtime across the client devices by performing Wi-Fi 6 airtime management to assign MU-MIMO spatial streams to the Wi-Fi 6 STAs with MU-MIMO capability, and
wherein a weight of airtime allocated to each Wi-Fi 6 STA with MU-MIMO capability is based on a number of antennas of each Wi-Fi 6 STA, respectively, such that a Wi-Fi 6 STA with multiple antennas is allocated a greater weight of airtime than a Wi-Fi 6 STA with a single antenna; and
when the plurality of client devices include a combination of one or more legacy Wi-Fi STAs, one or more Wi-Fi 6 STAs without MU-MIMO capability, and one or more Wi-Fi 6 STAs with MU-MIMO capability, the instructions when executed by the processor causing the gateway device to:
distribute the available airtime across the client devices by performing mixed airtime management, including:
performing legacy airtime management to assign OFDM frames to the one or more legacy Wi-Fi STAs, which uses all bandwidth and all spatial streams,
performing Wi-Fi 6 resource (RU) management to assign OFDMA subcarriers to the one or more Wi-Fi 6 STAs without MU-MIMO capability, which uses only a subset of the subcarriers and all spatial streams, and
performing Wi-Fi 6 airtime management to assign MU-MIMO spatial streams to the one or more Wi-Fi 6 STAs with MU-MIMO capability, which uses all bandwidth and only a subset of the spatial streams.

16. The non-transitory computer-readable medium of claim 15, wherein, when the plurality of client devices are all legacy Wi-Fi STAs, the instructions when executed by the processor causing the gateway device to distribute the available airtime across the client devices by performing legacy airtime management to assign orthogonal frequency-division multiplexing (OFDM) frames to the legacy Wi-Fi STAs.

17. The non-transitory computer-readable medium of claim 15, wherein, when the plurality of client devices are all Wi-Fi 6 STAs without MU-MIMO capability, the instructions when executed by the processor causing the gateway device to distribute the available airtime across the client devices by performing Wi-Fi 6 resource unit (RU) management to assign orthogonal frequency-division multiple-access (OFDMA) subcarriers to the Wi-Fi 6 STAs without MU-MIMO capability.

18. The non-transitory computer-readable medium of claim 15, wherein at least some of the one or more legacy Wi-Fi STAs, the one or more Wi-Fi 6 STAs without MU-MIMO capability, and the one or more Wi-Fi 6 STAs with MU-MIMO capability have different weights of airtime allocated thereto, respectively.

19. The non-transitory computer-readable medium of claim 15, wherein the weight is configured manually using a user interface of an application of the gateway device.

20. The non-transitory computer-readable medium of claim 15, wherein the weight is configured automatically by the gateway device based on any of historical usage, current usage, signal strength, or any combination thereof.

21. The non-transitory computer-readable medium of claim 15, wherein the instructions when executed by the processor causing the gateway device to:
determine whether or not the Wi-Fi 6 STAs have MU-MIMO capability, wherein the determining comprises:
querying the plurality of client devices to request a response indicating whether the client devices have MU-MIMO capability;
refer to a pre-stored device configuration information table relating to the plurality of client devices; or
obtain MU-MIMO capability information upon each of the plurality of devices associating to the WLAN.

* * * * *